(12) United States Patent
Goto

(10) Patent No.: US 11,440,178 B2
(45) Date of Patent: Sep. 13, 2022

(54) ELONGATED TOOL SUPPORT DEVICE AND ELONGATED TOOL SUPPORT METHOD

(71) Applicant: NAGAKI SEIKI CO., LTD., Osaka (JP)

(72) Inventor: Masanori Goto, Aomori (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 88 days.

(21) Appl. No.: 16/606,067

(22) PCT Filed: Apr. 17, 2018

(86) PCT No.: PCT/JP2018/015865
§ 371 (c)(1),
(2) Date: Oct. 17, 2019

(87) PCT Pub. No.: WO2018/194055
PCT Pub. Date: Oct. 25, 2018

(65) Prior Publication Data
US 2020/0039055 A1     Feb. 6, 2020

(30) Foreign Application Priority Data

Apr. 21, 2017 (JP) .............................. JP2017-084900

(51) Int. Cl.
*B25H 1/10*      (2006.01)
*B25H 1/00*      (2006.01)
*H02G 1/02*      (2006.01)

(52) U.S. Cl.
CPC ............. *B25H 1/10* (2013.01); *B25H 1/0042* (2013.01); *H02G 1/02* (2013.01)

(58) Field of Classification Search
CPC ...... B25H 1/10; B25H 1/0042; B25H 1/0035; B25H 1/005; B25H 1/0021; B25H 1/18; H02G 1/02
(Continued)

(56) References Cited

U.S. PATENT DOCUMENTS 1,220,266 A * 3/1917 Ott ............................ A61J 9/06
                                                                         248/103
1,688,148 A * 10/1928 Martin ..................... B60Q 7/00
                                                              224/558

(Continued)

FOREIGN PATENT DOCUMENTS

| CN | 103355275 A | 10/2013 |
|---|---|---|
| CN | 205567552 U | 9/2016 |

(Continued)

OTHER PUBLICATIONS

Australia Patent Office, Examination report No. 1 for standard patent application.
(Continued)

*Primary Examiner* — Muhammad Ijaz
(74) *Attorney, Agent, or Firm* — Li & Cai Intellectual Property (USA) Office

(57) ABSTRACT

An elongated tool support device, which is used to support an elongated tool, includes a securing tool, a first shaft support, a brace member, and a second shaft support. The first shaft support is configured to support a shaft portion of the elongated tool from below. The brace member is disposed between the securing tool and the first shaft support. The second shaft support is attached to the brace member and configured to support the shaft portion of the elongated tool from above.

10 Claims, 12 Drawing Sheets

(58) Field of Classification Search
USPC .................................. 248/514, 75, 80, 84
See application file for complete search history.

(56) References Cited

U.S. PATENT DOCUMENTS

| | | | | |
|---|---|---|---|---|
| 2,661,563 | A * | 12/1953 | Humphries | A01K 97/11 43/16 |
| 2,667,317 | A * | 1/1954 | Trebules | H01Q 1/084 52/298 |
| 4,458,870 | A * | 7/1984 | Duncan | A61G 5/10 248/279.1 |
| 6,112,449 | A * | 9/2000 | Blackwell | A01K 97/10 248/538 |
| 6,898,893 | B1 * | 5/2005 | Mukdaprakorn | A01K 97/10 248/538 |
| 7,178,777 | B1 * | 2/2007 | Banker | B25H 3/006 248/316.7 |
| D873,109 | S * | 1/2020 | Goto | D8/72 |
| 2008/0134565 | A1 | 6/2008 | Sutherland et al. | |
| 2016/0263738 | A1* | 9/2016 | May | B25H 1/0057 |
| 2020/0039055 | A1* | 2/2020 | Goto | H02G 1/02 |

FOREIGN PATENT DOCUMENTS

| | | |
|---|---|---|
| JP | 060382 U | 8/1994 |
| JP | 6060382 U | 8/1994 |
| JP | 2000-095484 A | 4/2000 |
| JP | 2010-252457 A | 11/2010 |
| JP | 3181015 U | 1/2013 |
| JP | 5306031 B2 | 10/2013 |

OTHER PUBLICATIONS

Japan Patent Office, Office action dated Sep. 23, 2020.
European Patent Office, Search report dated Apr. 3, 2020.
KIPO, Office Action dated Jan. 31, 2020 regarding Korean Patent Application No. 10-2018-0045036.
WIPO, International Search Report dated May 29, 2018.
WIPO, Written Opinion dated May 29, 2018.
Taiwan Patent Office, Office action dated Oct. 4, 2019.
China Patent Office, Office Action dated Jun. 24, 2022 regarding Chinese Patent Application No. 201810351376.5.

* cited by examiner

ELONGATED TOOL SUPPORT DEVICE AND ELONGATED TOOL SUPPORT METHOD

FIELD OF THE DISCLOSURE

The present invention relates to an elongated tool support device and an elongated tool support method.

BACKGROUND OF THE DISCLOSURE

When indirect live-wire work is performed using an indirect live-wire tool such as a hot stick, a worker grasps a handle part of an indirect live-wire tool with one hand and manipulates a manipulated part with the other hand. In this case, the worker must support a load (gravity, etc.) acting on the indirect live-wire tool during the work, which is a burden for the worker. In view of this, there is a feature by which a support device that supports an indirect live-wire tool or another tool is attached to a bucket of a high-elevation work vehicle, etc., in order to reduce the burden on the worker.

As a relevant feature, Patent Document 1 discloses an indirect live-wire tool support (a hot stick support). The hot stick support disclosed in Patent Document 1 is an implement that supports a hot stick having an insulated manipulated rod, a tip end tool being attached to a distal end thereof. The hot stick support disclosed in Patent Document 1 is provided with a rail part secured to a peripheral wall of a bucket of a high-elevation work vehicle, a slider part that can slide and be fixed in position in relation to the rail part, a support column provided upright on the slider part, and a rod-mounting part provided to an upper end part of the support column such that the rod-mounting part can be turned and fixed in position. The rod-mounting part detachably supports the hot stick.

CITATION LIST

Patent Literature

Patent Document 1: Japanese Patent Publication No. 5306031

SUMMARY OF THE DISCLOSURE

Technical Problem

With the indirect live-wire tool support disclosed in Patent Document 1, the rod-mounting part has an elastically deformable cylinder part capable of receiving the hot stick (insulated manipulated rod), an opening part provided to the cylinder part, and a pair of flange parts protruding so as to widen outward from an end edge part of the opening part. When the hot stick (insulated manipulated rod) is mounted on the rod-mounting part, firstly, the insulated manipulated rod is brought into contact with the pair of flanges. Secondly, the insulated manipulated rod is pushed in towards an interior of the cylinder part. As a result, the opening part elastically deforms and widens in a width direction, and the insulated manipulated rod is inserted into the interior of the cylinder part.

With the indirect live-wire tool support disclosed in Patent Document 1, the hot stick (insulated manipulated rod) is mounted on the rod-mounting part using the elastic deformation of the cylinder part. Therefore, when the elasticity of the cylinder part has not been appropriately adjusted, there is a risk that the work of mounting the hot stick on the rod-mounting part or the work of removing the hot stick from the rod-mounting part will be difficult. Additionally, with indirect live-wire tool support disclosed in Patent Document 1, a hot stick (insulated manipulated rod) having an outside diameter different from an inside diameter of the cylinder part cannot be appropriately supported.

In view of this, an object of the present invention is to provide an elongated tool support device and an elongated tool support method, with which an elongated tool can be supported with a simple manipulation and removed with a simple manipulation.

Solution to Problem

The present invention relates to the elongated tool support device and the elongated tool support method presented below.

An elongated tool support device includes a securing tool, a first shaft support, a brace member, and a second shaft support. The first shaft support is disposed farther toward a distal side than the securing tool and supports a shaft portion of an elongated tool from below. The brace member is disposed between the securing tool and the first shaft support. The second shaft support is attached to the brace member and supports the shaft portion of the elongated tool from above.

Advantageous Effects of Invention

According to the present invention, it is possible to provide an elongated tool support device and an elongated tool support method, with which an elongated tool can be supported with a simple manipulation and removed with a simple manipulation.

DETAILED DESCRIPTION OF THE EXEMPLARY EMBODIMENTS

Elongated tool support devices of the embodiments are described in detail below with reference to the drawings. In the present specification, members having the same function are designated by the same or similar symbols. In some instances, members designated by the same or similar symbols are described no more than once.

Definitions of Directions

In the present specification, a direction oriented from a base end (proximal end) of a brace member 4 toward a tip end (distal end) of the brace member 4 is defined as an "X direction". A direction perpendicular to the "X direction" and also perpendicular to a direction in which an elongated tool T supported by an elongated tool support device 1 is defined as a "Y direction".

First Embodiment

Figure 1:
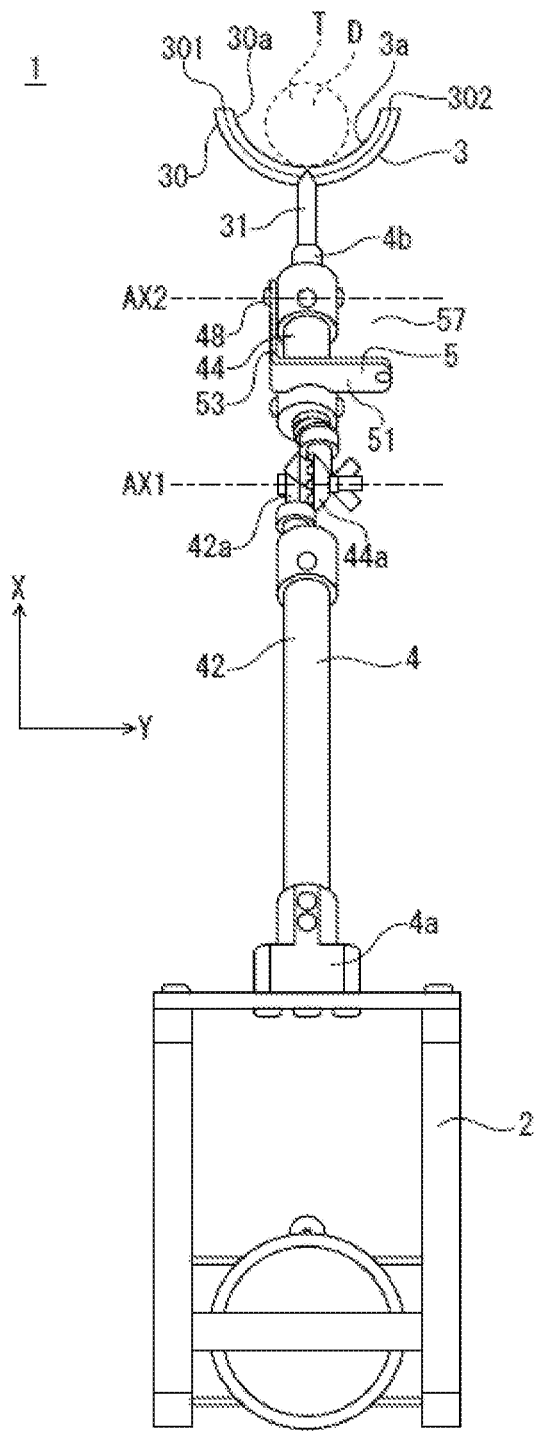
FIG. 1 is a schematic front view of an elongated tool support device in a first embodiment.
Figure 2:
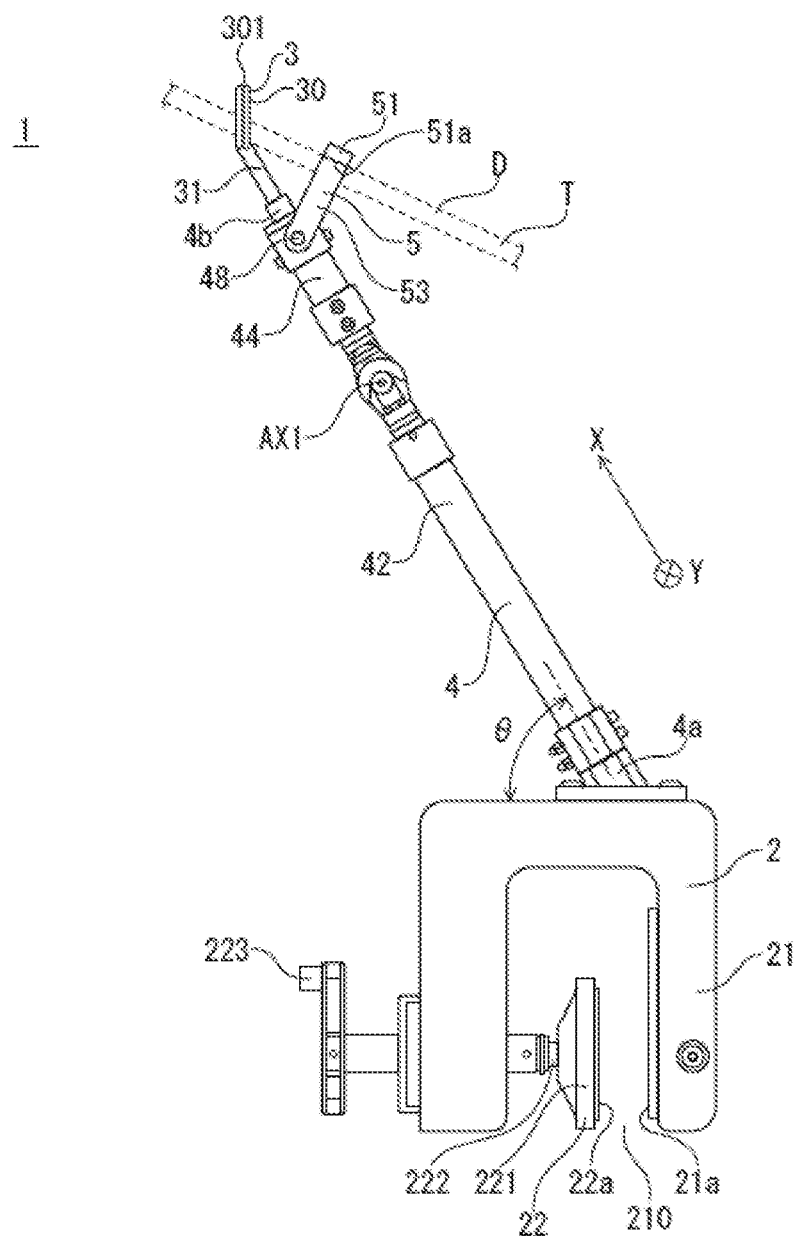
FIG. 2 is a schematic side view of the elongated tool support device in the first embodiment.
Figure 3:
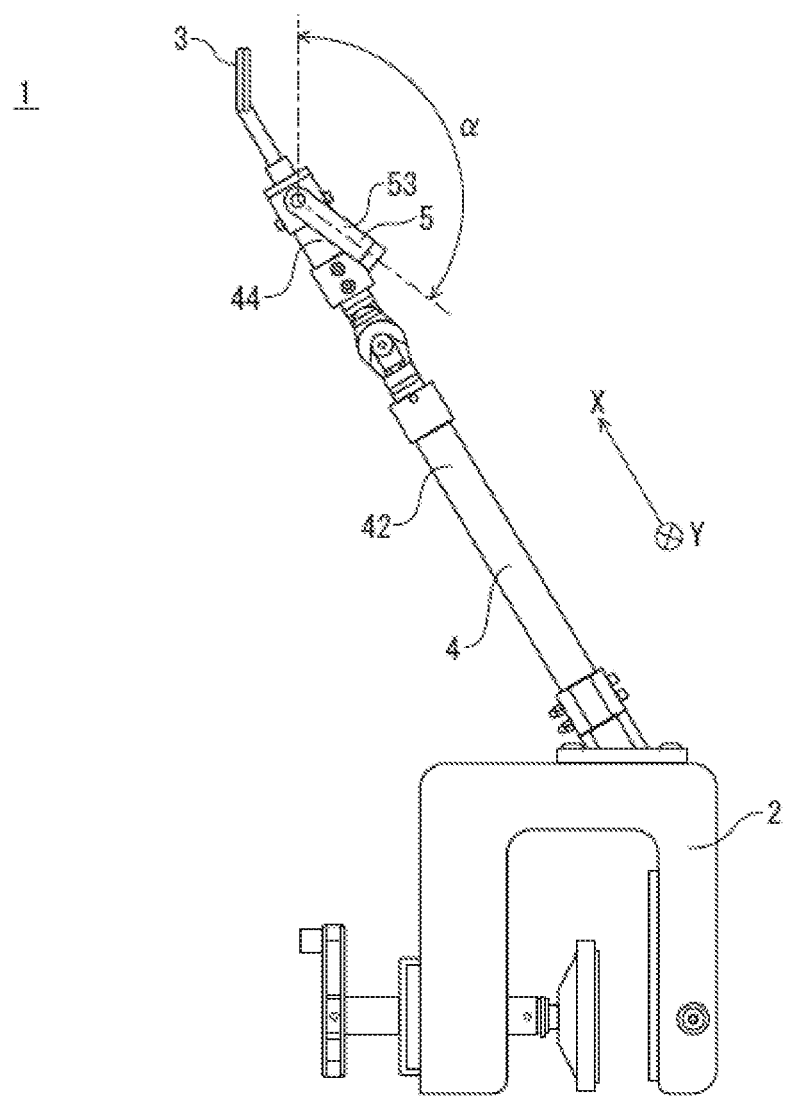
FIG. 3 is a schematic side view of the elongated tool support device in the first embodiment, wherein a second shaft support is in a retracted position.

The elongated tool support device 1 in a first embodiment shall be described with reference to FIGS. 1 through 3. FIG. 1 is a schematic front view of the elongated tool support device 1 in the first embodiment. FIGS. 2 and 3 are schematic side views of the elongated tool support device 1 in the first embodiment. FIG. 2 shows a state in which a second shaft support 5 is in a first position of supporting a shaft portion D of the elongated tool, and FIG. 3 shows a state in which the second shaft support 5 is in a second position which is a retracted position.

Referring to FIG. 1, the elongated tool support device 1 in the first embodiment is provided with a securing tool 2, a first shaft support 3, the brace member 4, and the second shaft support 5.

The securing tool 2 is an implement by which the elongated tool support device 1 is attached to an attachment object (a bucket of a high-elevation work vehicle, or another structural member). The securing tool 2 is disposed on a proximal side of the elongated tool support device 1.

The first shaft support 3 is disposed farther toward the distal side than the securing tool 2, and is an implement that supports the shaft portion D of the elongated tool from below. In FIG. 1, the shaft portion D of the elongated tool is shown by a dashed line.

The brace member 4 is disposed between the securing tool 2 and the first shaft support 3. The brace member 4 has an elongated shape. The brace member 4 is, for example, a tubular member (a hollow rod-shaped member) or a solid rod-shaped member. In the example shown in FIG. 1, the securing tool 2 is connected to the proximal end of the brace member 4, and the first shaft support 3 is connected to the distal end of the brace member 4.

The second shaft support 5 is attached to the brace member 4, and is an implement that supports the shaft portion D of the elongated tool from above (in other words, an implement that is in contact with an upper surface of the shaft portion D). FIG. 2 shows how the second shaft support 5 supports the shaft portion D from above. The position of the second shaft support 5 in a direction along the X direction is different from the position of the first shaft support 3 in a direction along the X direction. In the example shown in FIG. 2, the second shaft support 5 is disposed in a middle part of the brace member 4, and the first shaft support 3 is disposed on a distal-end part of the brace member 4.

For the elongated tool T to be supported on the elongated tool support device 1, the shaft portion D of the elongated tool is disposed between the first shaft support 3 and the second shaft support 5. A tool main body of relatively large mass is disposed at a distal part of the elongated tool. Therefore, the distal part of the elongated tool falls, and a rotational moment acts on the elongated tool in a direction in which a proximal part of the elongated tool rises. The first shaft support 3 and the second shaft support 5 support the elongated tool T so as to resist the rotational moment.

In the first embodiment, in order for the elongated tool T to be supported on the elongated tool support device 1, the shaft portion D of the elongated tool need only be disposed between the first shaft support 3 and the second shaft support 5. Therefore, the elongated tool support device 1 in the first embodiment is able to support the elongated tool T with a simple manipulation. In order for the elongated tool to be taken off the elongated tool support device 1, the shaft portion D of the elongated tool need only be moved to another area from the area between the first shaft support 3 and the second shaft support 5.

The configurations of the elongated tool support device 1 shall next be described in more detail.

Securing Tool 2

The securing tool 2 is an implement by which the elongated tool support device 1 is attached to an attachment object (a bucket of a high-elevation work vehicle, etc.). In the example shown in FIG. 2, the securing tool 2 has a first grasping member 21 and a second grasping member 22. A grasping surface 21a of the first grasping member 21 and a grasping surface 22a of the second grasping member 22 are capable of moving toward and away from each other.

In the example shown in FIG. 2, the first grasping member 21 is a frame-shaped member having an opening part 210. The first grasping member 21 functions as a base part to which the brace member 4 is connected. The second grasping member 22 is attached to the first grasping member 21 so as to be able to move relative to the first grasping member 21. In the example shown in FIG. 2, the second grasping member 22 has a pressing part 221, a shaft part 222 that supports the pressing part 221, and a manipulated member 223 connected to the shaft part 222. In the example shown in FIG. 2, rotating the manipulated member 223 in a first direction causes the pressing part 221 to move in a direction toward the grasping surface 21a of the first grasping member 21. Conversely, rotating the manipulated member 223 in a direction opposite the first direction causes the pressing part 221 to move in a direction away from the grasping surface 21a of the first grasping member 21. Therefore, an attachment object, e.g., a bucket of a high-elevation work vehicle can be clamped by the first grasping member 21 and the second grasping member 22 by rotating the manipulated member 223 in the first direction.

In the first embodiment, the configuration of the securing tool 2 is not limited to the example shown in FIGS. 1 and 2. The securing tool 2 may be any sort of implement as long as the elongated tool support device 1 can thereby secured to a bucket or other attachment object. For example, through-holes may be provided to both the base part of the elongated tool support device 1 and a side wall of the bucket, and the elongated tool support device 1 may be secured to the bucket by nuts and bolts inserted through these through-holes. In this case, the base part of the elongated tool support device 1, the bolts, and the nuts constitute the securing tool 2.

First Shaft Support 3

The first shaft support 3 is disposed farther toward the distal side than the securing tool 2, and is an implement that supports the shaft portion D of the elongated tool from below. In the example shown in FIG. 1, the first shaft support 3 is provided with a placement surface 3a on which the shaft portion D is placed. The placement surface 3a may be a concave surface in which a central part in a direction along the Y direction is the deepest recessed. Particularly, when the placement surface 3a is a curved, concave surface, the shaft portion D placed on the placement surface 3a is positioned in the deepest part of the placement surface 3a.

In the example shown in FIG. 1, an upper part of the placement surface 3a is always open. Therefore, a worker can easily place the shaft portion D of the elongated tool upon the placement surface 3a. The worker can also easily lift up the elongated tool T placed on the placement surface 3a. Specifically, when the upper part of the placement surface 3a is open, the worker can even more easily cause the elongated tool T to be supported on the elongated tool support device 1, and even more easily take the elongated tool T off the elongated tool support device 1.

In the example shown in FIG. 1, the first shaft support 3 is provided with a support part 30 in the shape of a letter U, in which a space between a first end part 301 and a second end part 302 is open. In the example shown in FIG. 1, an upper part of the support part 30 is open. Alternatively, a side part of the support part 30 may be open. In this case, the shaft portion D of the elongated tool would be received from the side in a space defined by the support part 30.

A coating layer 30a may be disposed on an upper surface of the support part 30 so that the elongated tool T is not damaged by contact between the support part and the elongated tool. Alternatively, a cushion material (impact-absorbing layer) may be disposed on the upper surface of the support part 30.

In the example shown in FIG. 2, the support part 30 of the first shaft support 3 is connected to the brace member 4 via a shaft part 31. In a side view (seen in a direction along the Y direction), the support part 30 and the shaft part 31 are connected so that an angle between the support part 30 and the shaft part 31 is less than 180 degrees. The angle between the support part 30 and the shaft part 31 is, for example, 120 to 160 degrees (inclusive). Due to the angle between the support part 30 and the shaft part 31 being less than 180 degrees, a direction in which the first end part 301 of the support part 30 extends and a direction in which the second end part 302 extends are nearly vertically upward. As a result, the shaft portion D does not readily fall off the placement surface 3a.

Figure 4:
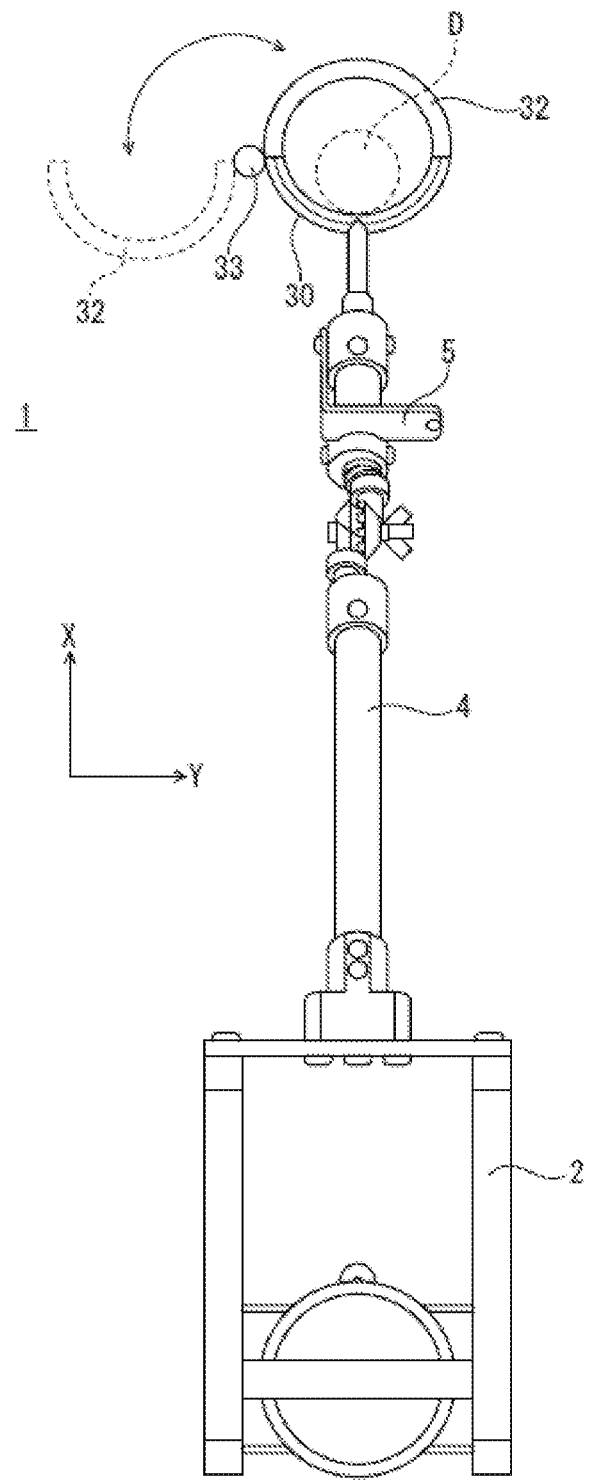
FIG. 4 is a schematic front view of the elongated tool support device in the first embodiment (modification)

The first shaft support 3 may have an opening/closing member 32 that from above covers the shaft portion D placed on the placement surface 3a, as shown in FIG. 4. The opening/closing member 32 is linked to the support part 30 via, for example, a hinge 33. The opening/closing member 32 opens the upper part of the placement surface 3a in an open position, and covers the upper part of the placement surface 3a in a closed position. When the first shaft support 3 is provided with the opening/closing member 32, the shaft portion D of the elongated tool is prevented from accidentally falling off the placement surface 3a even when, for example, the bucket unexpectedly moves up and down. A lock mechanism that secures the opening/closing member 32 in the closed position may be provided to the first shaft support 3. The opening/closing member 32 when provided is preferably disposed in a position within reach of the worker's hand (e.g., a position 1 m or less from the securing tool 2), but there is no such limitation when the opening/closing member 32 is not provided.

Brace Member 4

The brace member 4 is disposed between the securing tool 2 and the first shaft support 3. A proximal part 4a of the brace member 4 is connected to the securing tool 2 by a bolt or another fastening tool. In the example shown in FIG. 2, the brace member 4 is connected to the securing tool so as to extend at an incline from the securing tool 2. An attachment angle θ of the brace member 4 relative to the securing tool 2 is greater than 0 degrees and not more than 90 degrees, and is preferably 10 to 80 degrees (inclusive).

A distal end part 4b of the brace member 4 is connected to the first shaft support 3. The brace member 4 and the first shaft support 3 may be integrally molded into a single member.

In the example shown in FIG. 1, the brace member 4 is provided with a first portion 42 connected to the securing tool 2, and a second portion 44 connected to the first shaft support 3. The second portion 44 is connected so that an angle thereof can be adjusted and fixed (in other words, the position can be fixed) about a first axis AX1, relative to the first portion 42. The first axis AX1 is perpendicular to a longitudinal direction of the brace member 4. More specifically, the first axis AX1 is perpendicular to a longitudinal direction of the second portion 44 of the brace member 4, e.g., parallel to the Y direction.

A first example of a connecting mechanism between the first portion 42 and the second portion 44 shall be described. In the first example, as shown in FIG. 1, a first rosette part 42a (the term "rosette part" means a portion in which a plurality of protrusions are disposed in a radial formation) having a seating surface perpendicular to the first axis AX1 is provided to a distal part of the first portion 42, and a second rosette part 44a that has a seating surface perpendicular to the first axis AX1 and fits with the first rosette part 42a is provided to a proximal part of the second portion 44. The seating parts are then secured with the first rosette part 42a and the second rosette part 44a fitted together, whereby the first portion 42 and the second portion 44 are connected so that angles thereof can be adjusted and fixed about the first axis AX1. In the example shown in FIG. 1, a bolt is disposed so as to pass through a center part of the first rosette part 42a and a center part of the second rosette part 44a, and a butterfly nut is fastened to the bolt, whereby the seating parts are secured.

Figure 5:
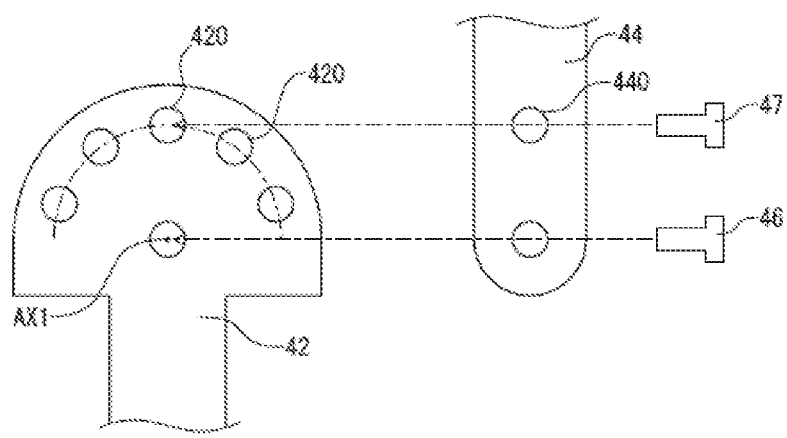
FIG. 5 is a drawing schematically depicting an example of a connecting mechanism between a first portion and a second portion of a brace member.

A second example of a connecting mechanism between the first portion 42 and the second portion 44 shall be described with reference to FIG. 5. FIG. 5 is a drawing schematically depicting an example of the connecting mechanism between the first portion 42 and the second portion 44. In the second example, the distal part of the first portion 42 and the proximal part of the second portion 44 are linked via a shaft member 46 so as to be able to rotate about the first axis AX1. A plurality of through-holes 420 are provided in the distal part of the first portion 42, and a through-hole 440 that selectively aligned with any of the plurality of through-holes 420 is provided in the proximal part of the second portion 44. A securing pin 47 is disposed so as to pass through any of the plurality of through-holes 420 and the through-hole 440, whereby the first portion 42 and the second portion 44 are connected so that the angles thereof can be adjusted and fixed about the first axis AX1.

A third example of a connecting mechanism between the first portion 42 and the second portion 44 shall be described. In the first and second examples described above, an angle adjustment mechanism between the first portion 42 and the second portion 44 is capable of incremental angle adjustment. By contrast, in the third example, the angle adjustment mechanism between the first portion 42 and the second portion 44 is capable of continuous angle adjustment. For example, a ball joint is universally known as an angle adjustment mechanism capable of continuous angle adjustment (if necessary, refer to Japanese Patent Publication No. 4279128 for an example of a ball joint). In the third example, the first portion 42 and the second portion 44 are connected via an angle adjustment mechanism capable of continuous angle adjustment. The angle of the second portion 44 relative to the first portion 42 can be adjusted and fixed about any axis including the first axis AX1.

In the first embodiment, first through third examples described above are not provided by way of limitation on the connecting mechanism between the first portion 42 and the second portion 44. The connecting mechanism between the first portion 42 and the second portion 44 may be any sort of mechanism that connects the first portion 42 and the second portion 44 such that the angles thereof can be adjusted and fixed about the first axis AX1.

When the elongated tool support device 1 is provided with a connecting mechanism that connects the first portion 42 and the second portion 44 so that the angles thereof can be adjusted and fixed about the first axis AX1, a position of a tip end part of the elongated tool T (i.e., a tool position) supported by the elongated tool support device 1 and/or a tilt of the elongated tool T can be roughly adjusted.

In the examples described above, the first portion 42 and the second portion 44 are connected via a first angle adjustment mechanism. From the standpoint of manipulability, the first axis AX1 passing through the first portion 42 and the second portion 44 is preferably disposed in a position within reach of the worker's hand (e.g., a position 1 m or less from the securing tool 2). In the examples described above, the first portion 42 is in the form of a rod, and the second portion 44 is in the form of a rod as well. Alternatively, the first portion 42 may have a shape other than the form of a rod.

Second Shaft Support 5

Referring to FIG. 2, the second shaft support 5 is attached to the brace member 4, and is an implement that supports the shaft portion D of the elongated tool from above (in other words, an implement that is in contact with the upper surface of the shaft portion D of the elongated tool). When the brace member 4 is provided with the first portion 42 and the second portion 44 described above, the second shaft support 5 is preferably attached to the second portion 44. In other words, the second shaft support 5 is preferably disposed between the first shaft support 3 and the first axis AX1 described above. The second shaft support 5 is attached to the second portion 44, whereby a distance between the second shaft support 5 and the first shaft support 3 shortens. When the distance between the second shaft support 5 and the first shaft support 3 is short, a size of the second shaft support 5 can be reduced.

In the example shown in FIG. 2, the second shaft support 5 has a contact part 51 that comes into contact with the upper surface of the shaft portion D of the elongated tool, and an arm 53 that connects the contact part 51 and the brace member 4. The contact part 51 has an inner-side surface 51a (in other words, a surface facing the brace member 4). The inner-side surface 51a comes into contact with the shaft portion D and supports the shaft portion D.

In the example shown in FIGS. 2 and 3, the second shaft support 5 can move between a first position (the position shown in FIG. 2) at which the shaft portion D of the elongated tool is supported, and a second position (the position shown in FIG. 3), which is a retracted position.

When the second shaft support 5 can be moved to the second position, which is a retracted position, the elongated tool T can be manipulated in a state in which a base end part of the elongated tool T is supported by hand and the shaft portion D of the elongated tool is supported by the first shaft support 3. At this time, the second shaft support 5 is in the retracted position, and the second shaft support 5 therefore does not interfere with the manipulation of the elongated tool T.

An example of a mechanism that moves the second shaft support 5 between the first position and the second position shall be described with reference to FIG. 1. In the example shown in FIG. 1, the second shaft support 5 is attached to brace member 4 so as to be capable of swinging about a second axis AX2. The second axis AX2 is perpendicular to the longitudinal direction of the brace member 4 (more specifically, perpendicular to the longitudinal direction of the second portion 44 of the brace member 4). The second axis AX2 may be parallel to the Y direction or parallel to the first axis AX1.

In the example shown in FIG. 1, a shaft pin 48 is disposed in the brace member 4 so as to extend along the second axis AX2. The second shaft support 5 is free to turn about the shaft pin 48. Through-holes through which the shaft pin 48 is inserted may be provided in each of the brace member 4 and the second shaft support 5.

In the example shown in FIGS. 1 and 2, the second shaft support 5 is preferably connected to the brace member 4 in a state such that the angle of the second shaft support 5 is not fixed about the second axis AX2. In other words, the second shaft support 5 is preferably always free to swing about the second axis AX2. When the second shaft support 5 is connected to the brace member 4 in a state such that the angle of the second shaft support 5 is not fixed relative to the brace member 4, the second shaft support 5, pushed upward by the elongated tool T, automatically moves to an optimal position. The optimal position of the second shaft support 5 is, for example, a position where a contact area between the contact part 51 and the shaft portion D of the elongated tool reaches a maximum.

In the example shown in FIG. 1, one side part of the second shaft support 5 is the arm 53, and the arm 53 (the second shaft support 5) is supported in cantilever fashion on the brace member 4. Another side part (the side) of the second shaft support 5 is an opening part 57. The shaft portion D of the elongated tool is inserted through the opening part 57 into a space between the second shaft support 5 and the brace member 4. In the example shown in FIG. 1, the second shaft support 5 has the shape of a letter L. One edge of the L shape constitutes the arm 53, and the other edge of the L shape constitutes the contact part 51, which is capable of coming into contact with the shaft portion D.

When one side part of the second shaft support 5 is the opening part 57, the worker is able to easily insert the shaft portion D of the elongated tool through the opening part 57 into the space between the second shaft support 5 and the brace member 4.

In the example shown in FIGS. 2 and 3, the second shaft support 5 functions as a swinging member that is free to swing about the second axis AX2. A swinging lower limit position of the second shaft support 5 is a position where the contact part 51 and the brace member 4 come into contact. A swing angle α (see FIG. 3) of the second shaft support 5, i.e., an angle at which the second shaft support 5 can swing from the swinging lower limit position to a swinging upper limit position is, for example, at least 90 degrees and less than 180 degrees.

Method for Supporting Elongated Tool Using Elongated Tool Support Device 1 in First Embodiment An example shall be described of a method for supporting the elongated tool using the elongated tool support device 1 in the first embodiment. In a first step ST1, a worker grasps the base end part of the elongated tool T and places the shaft portion D of the elongated tool on the first shaft support 3. In a second step ST2, the worker uses one hand to move the second shaft support 5 from the second position, which is a retracted position, toward the first position (the position shown in FIG. 2). In a step ST3, the worker uses the other hand to move the base end part of the elongated tool T and insert the shaft portion D of the elongated tool through the opening part 57 into the space between the second shaft support 5 and the brace member 4. In a fourth step ST4, the worker removes one hand from the second shaft support 5 and removes the other hand from the base end part of the elongated tool. In a fifth step ST5, the elongated tool T turns so that the upper surface of the shaft portion D of the elongated tool comes into contact with the contact part 51 of the second shaft support 5. Through the above steps, the elongated tool T is supported by the elongated tool support device 1.

Second Embodiment

Figure 6:
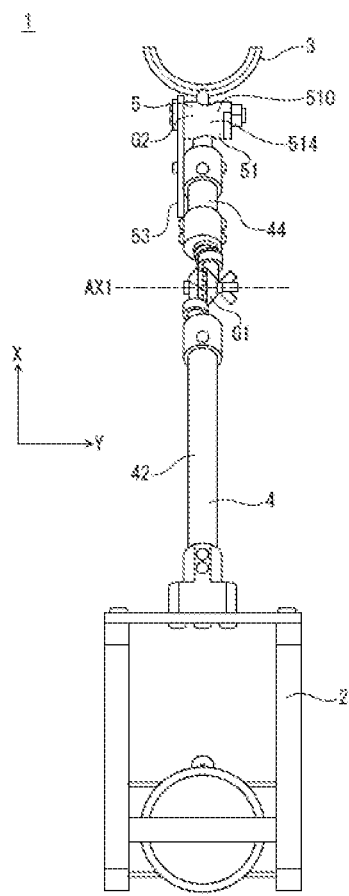
FIG. 6 is a schematic front view of an elongated tool support device in a second embodiment.
Figure 7:
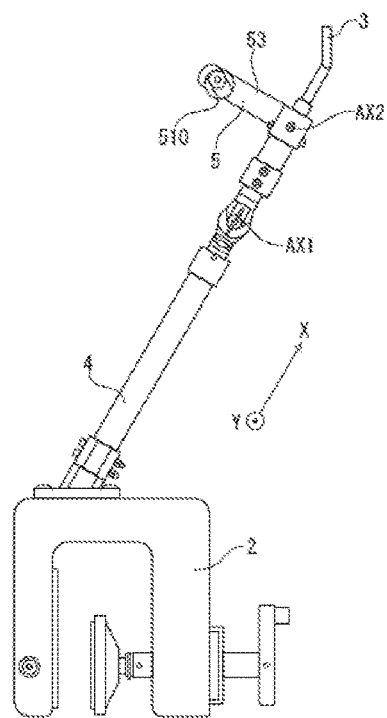
FIG. 7 is a schematic side view of the elongated tool support device in the second embodiment.
Figure 8:
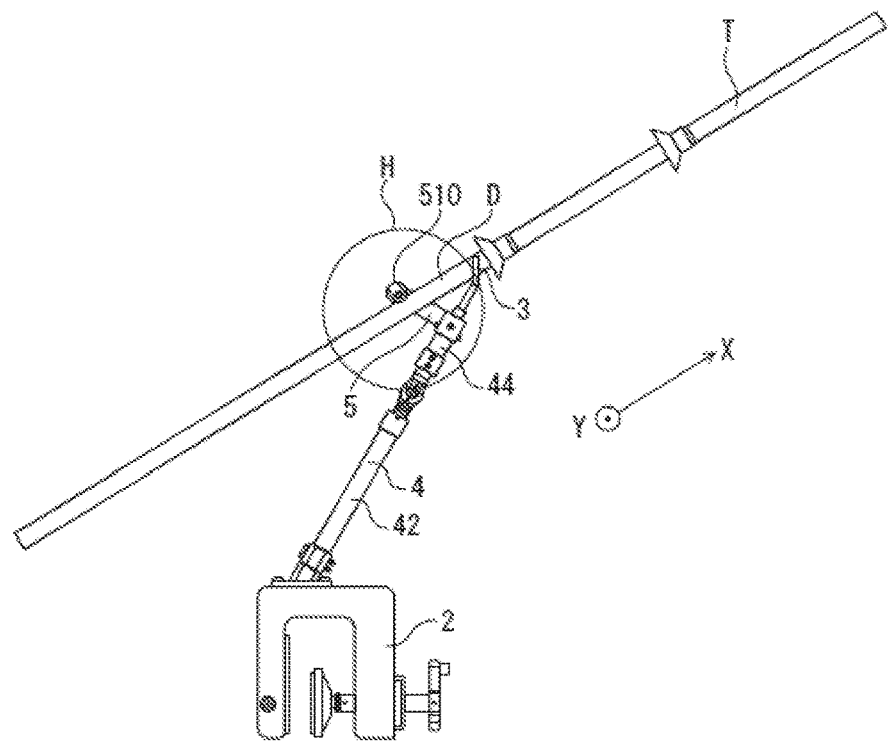
FIG. 8 is a schematic side view of the elongated tool support device in the second embodiment.
Figure 9:
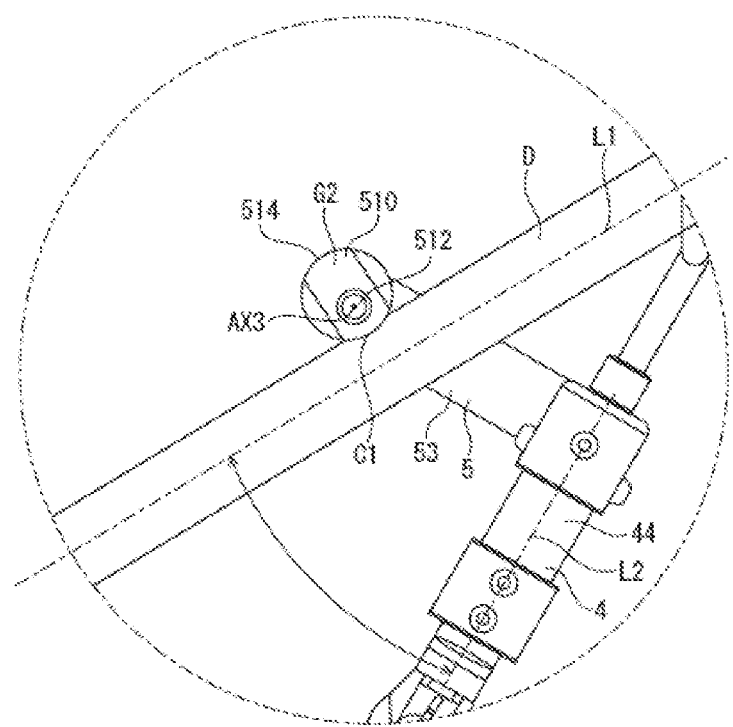
FIG. 9 is an enlarged view of an area H in FIG. 8.
Figure 10:
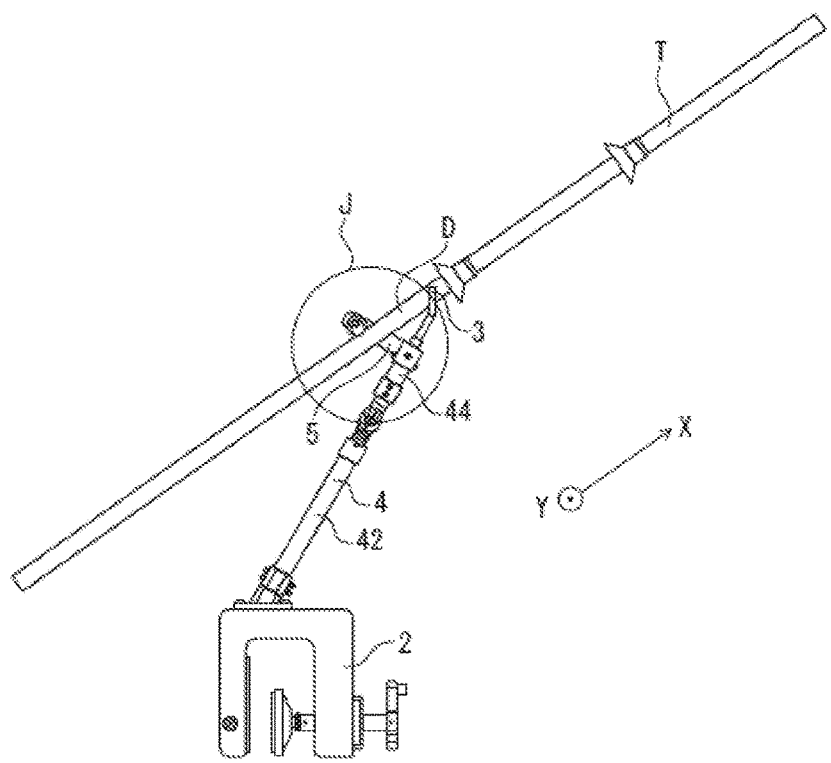
FIG. 10 is a schematic side view of the elongated tool support device in the second embodiment.
Figure 11:
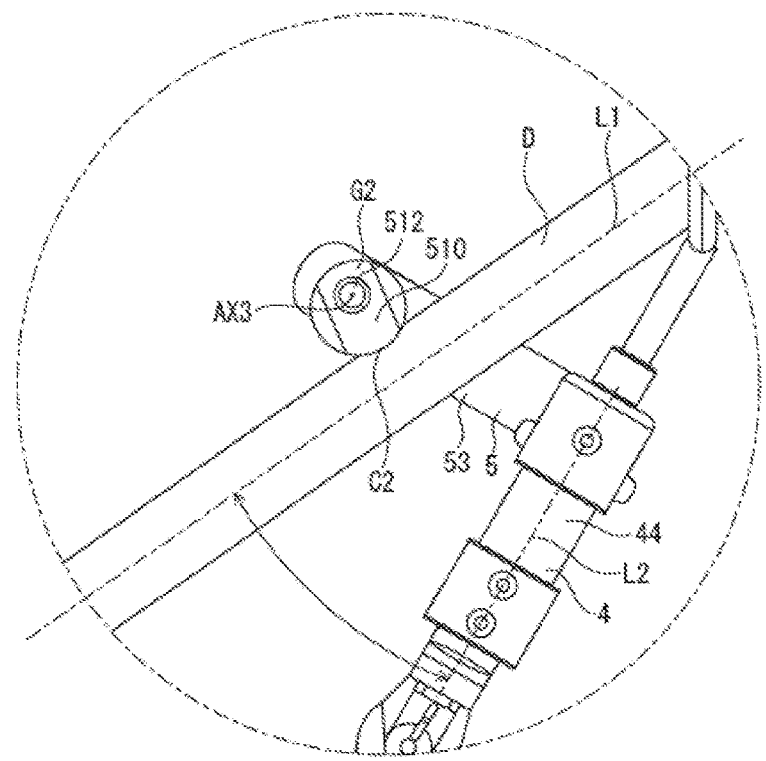
FIG. 11 is an enlarged view of an area J in FIG. 10.

The elongated tool support device 1 in a second embodiment shall be described with reference to FIGS. 6 through 11. FIG. 6 is a schematic front view of the elongated tool support device 1 in the second embodiment. FIG. 7 is a schematic side view of the elongated tool support device 1 in the second embodiment. FIG. 8 is a schematic side view of the elongated tool support device 1 in the second embodiment. FIG. 9 is an enlarged view of an area H in FIG. 8. FIG. 10 is a schematic side view of the elongated tool support device 1 in the second embodiment. FIG. 11 is an enlarged view of an area J in FIG. 10. FIGS. 8 through 11 depict a state in which the elongated tool T is supported by the elongated tool support device.

The elongated tool support device 1 in the second embodiment differs from the elongated tool support device 1 in the first embodiment in being provided with not only a first angle adjustment mechanism G1 that adjusts the angle between the first portion 42 and the second portion 44 of the brace member 4, but also a second angle adjustment mechanism G2 that adjusts an angle between a longitudinal axis L1 of the shaft portion D of the elongated tool supported by the elongated tool support device 1 and a longitudinal axis L2 of the brace member 4 (the second portion 44). The second embodiment is similar to the first embodiment in other respects. Therefore, in the second embodiment, the description focuses on the second angle adjustment mechanism G2, and descriptions that would be repetitive for other configurations are omitted.

First Example of Second Angle Adjustment Mechanism

A first example of the second angle adjustment mechanism G2 shall be described with reference to FIGS. 6 through 11. In the first example, the second angle adjustment mechanism G2 is provided with a cam member 510. More specifically, in the first example, the second shaft support 5 is provided with the arm 53 and the cam member 510 rotatably supported on the arm 53. The cam member 510 functions as the contact part 51 that comes into contact with the shaft portion D of the elongated tool.

The cam member 510 may be rotatably supported on a support pin 512 extending from the arm 53, as shown in FIG. 9. The cam member 510 can rotate about a center axis (in other words, a rotational axis AX3) of the support pin 512. A distance between the rotational axis AX3 and a portion of the cam member 510 that is in contact with the shaft portion D changes as the cam member 510 rotates about the rotational axis AX3. For example, a distance between the rotational axis AX3 and a contact portion C1 in the state shown in FIG. 9 is less than a distance between the rotational axis AX3 and a contact portion C2 in the state shown in FIG. 11. Therefore, in the first example, the angle between the longitudinal axis L1 of the shaft portion D and the longitudinal axis L2 of the brace member 4 (the second portion 44) can be adjusted by rotating the cam member 510. For example, the angle between the longitudinal axis L1 and the longitudinal axis L2 in the example shown in FIGS. 8 and 9 is greater than the angle between the longitudinal axis L1 and the longitudinal axis L2 in the example shown in FIGS. 10 and 11.

In the first example, the cam member 510 may have a manipulated knob part 514. In this case, the worker rotates the cam member 510 about the rotational axis AX3 by rotating the manipulated knob part 514 about the rotational axis AX3.

In the first example, it is preferred that the rotational angle of the cam member 510 relative to the support pin 512 can be fixed. In other words, it is preferred that the position of the cam member 510 can be fixed relative to the support pin 512. For example, the material of the cam member 510 and the support pin 512 may be selected so that an appropriate amount of frictional force is generated during relative rotation between the cam member 510 and the support pin 512. Alternatively, or additionally, a gap between the cam member 510 and the support pin 512 may be appropriately set so that an appropriate amount of frictional force is generated during relative rotation between the cam member 510 and the support pin 512. Alternatively, a ratchet mechanism for changing the rotational angle incrementally may be interposed between the cam member 510 and the support pin 512.

Second Example of Second Angle Adjustment Mechanism

Figure 12:
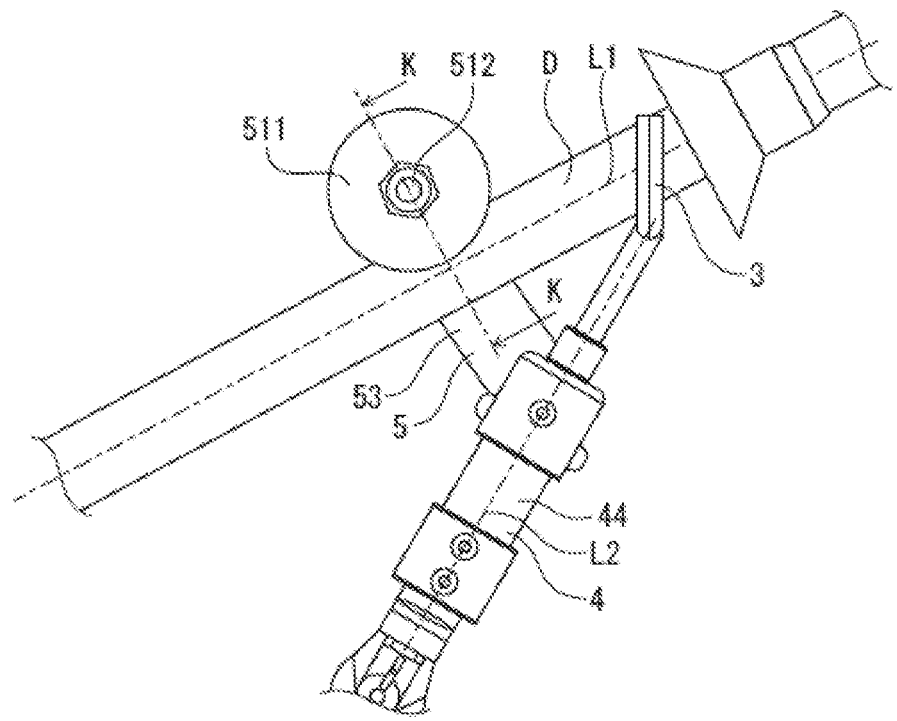
FIG. 12 is a schematic side view depicting an example of the second shaft support.
Figure 13:
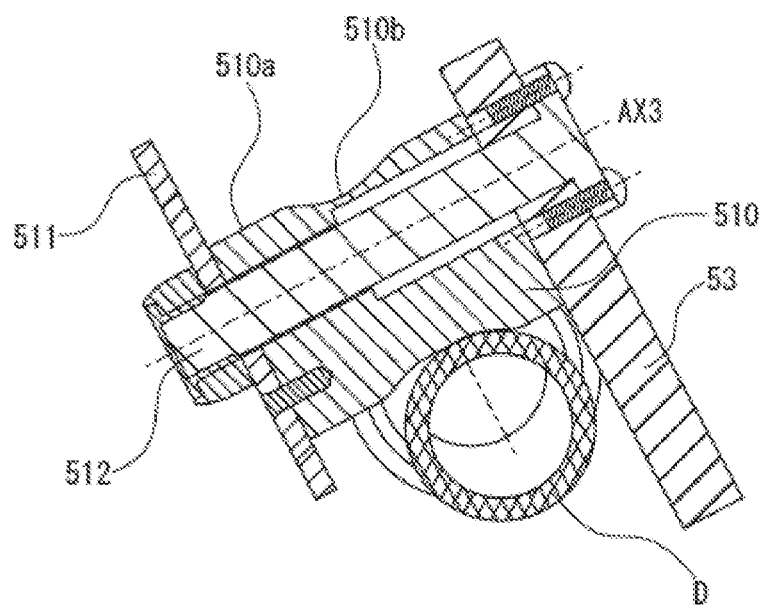
FIG. 13 is a cross-sectional view along arrow K-K of FIG. 12.

A second example of the second angle adjustment mechanism G2 shall be described with reference to FIGS. 12 and 13. FIG. 12 is a schematic side view depicting an example of the second shaft support 5, and a portion of the elongated tool support device 1 in the second embodiment. FIG. 13 is a cross-sectional view along arrow K-K of FIG. 12.

The second example of the second angle adjustment mechanism G2 differs from the first example of the second angle adjustment mechanism in that a groove 510b (in other words, a concave part) capable of receiving the shaft portion D is provided in an outer peripheral surface 510a of the cam member 510, and a fall-preventing plate 511 that prevents the shaft portion D from falling from the cam member 510 is provided. The second example of the second angle adjustment mechanism G2 is similar to the first example of the second angle adjustment mechanism in other respects.

The groove 510b is provided to a center part of the cam member 510, i.e., between a first end surface of the cam member 510 (an end surface on the arm 53 side) and a second end surface of the cam member 510 (an end surface on the side opposite the end surface on the arm 53 side). Due to the presence of the groove 510b, the shaft portion D is positioned in the center part of the cam member 510. In the example shown in FIG. 13, the groove 510b is an annular groove. A distance between a bottom part of the groove 510b and the rotational axis AX3 changes due to the cam member 510 being rotated about the rotational axis AX3. Therefore, the angle between the longitudinal axis L1 of the shaft portion D and the longitudinal axis L2 of the brace member 4 (the second portion 44) can be adjusted by rotating the cam member 510 in the second example of the second angle adjustment mechanism G2 as well.

In the example shown in FIG. 13, the fall-preventing plate 511 is disposed so as to face the second end surface of the cam member 510 (the end surface on the side opposite the end surface on the arm 53 side). The fall-preventing plate 511 prevents the shaft portion D from moving past the second end surface of the cam member 510 and falling from the cam member 510. Conversely, the arm 53 prevents the shaft portion D from moving past the first end surface of the cam member 510 and falling from the cam member 510. In the example shown in FIG. 12, the shape of the fall-preventing plate 511 is a circular plate, but the shape of the fall-preventing plate 511 is not limited to a circular plate.

Third Example of Second Angle Adjustment Mechanism

Figure 14:
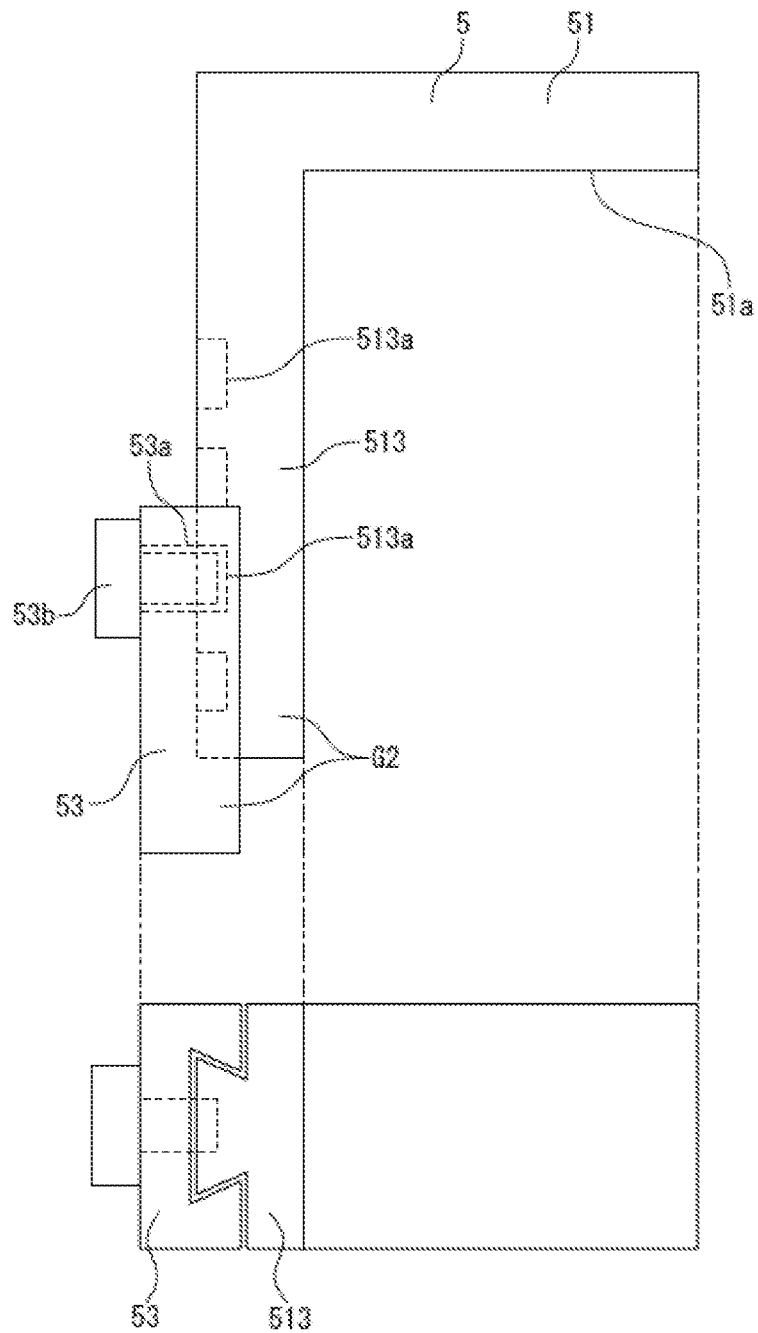
FIG. 14 is a two-view drawing showing an example of the second shaft support.

A third example of the second angle adjustment mechanism shall be described with reference to FIG. 14. FIG. 14 is a two-view drawing showing an example of the second shaft support 5. A side view of the second shaft support 5 is shown in an upper side of FIG. 14, and a bottom view of the second shaft support 5 is shown in a lower side of FIG. 14.

In the third example, the second angle adjustment mechanism G2 is provided with a slider 513. More specifically, in the third example, the second shaft support 5 is provided with the arm 53 and the slider 513 which is slidably supported on the arm 53. In the third example, the slider 513 moves in relation to the arm 53, whereby it is possible to adjust the angle between the longitudinal axis L1 of the shaft portion D of the elongated tool supported by the first shaft support 3 and the second shaft support 5 and the longitudinal axis L2 of the brace member 4 (the second portion 44).

In the third example, the slider 513 preferably can be positioned in relation to the arm 53. For example, a plurality of screw holes 513a may be provided in the slider 513, and a through-hole 53a may be provided in the arm 53. The position of the slider 513 may then be fixed in relation to the arm 53 by threading a screw member 53b inserted in the through-hole 53a into any of the plurality of screw holes 513a.

Fourth Example of Second Angle Adjustment Mechanism

Figure 15:
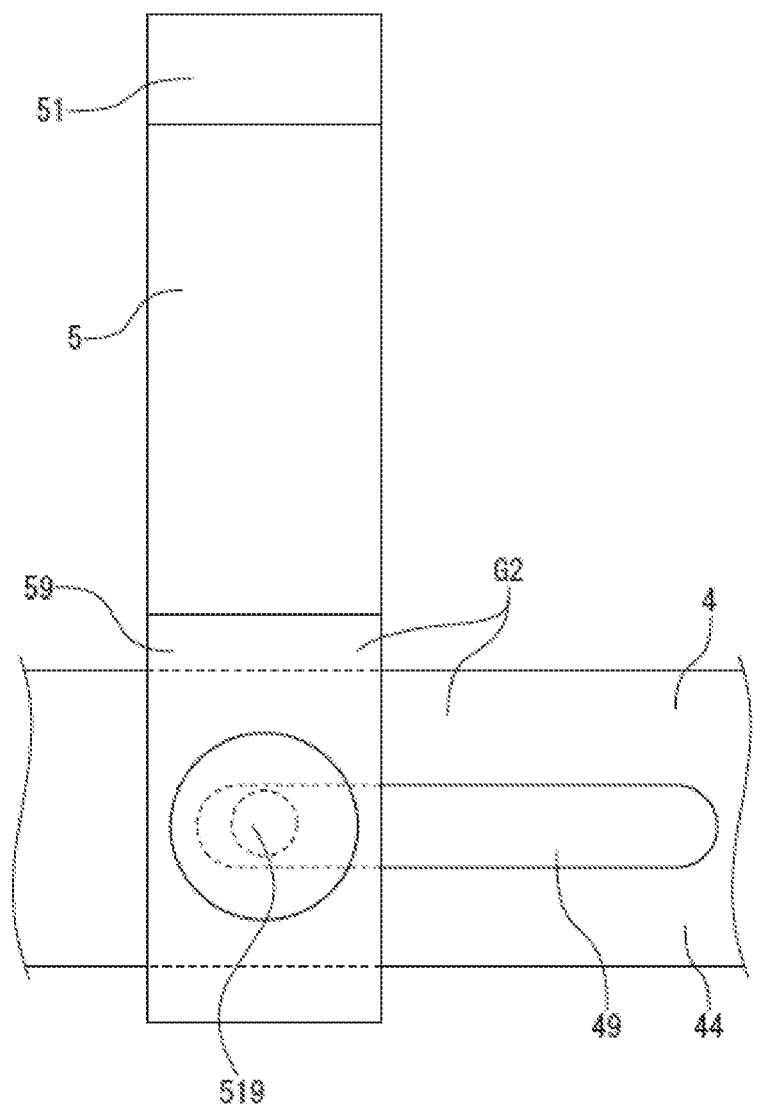
FIG. 15 is a schematic side view schematically depicting a linking portion (modification) between the brace member and the second shaft support.

A fourth example of the second angle adjustment mechanism shall be described with reference to FIG. 15. FIG. 15 is a schematic side view schematically depicting a linking portion between the brace member 4 (the second portion 44) and the second shaft support 5. In the fourth example, the second angle adjustment mechanism G2 is provided with a slider 59. More specifically, in the fourth example, the second shaft support 5 itself is a slider 59 that is free to slide in relation to the brace member 4. In the fourth example, the slider 59 (the second shaft support 5) slidably moves in relation to the brace member 4, whereby it is possible to adjust the angle between the longitudinal axis L1 of the shaft portion D of the elongated tool supported by the first shaft support 3 and the second shaft support 5 and the longitudinal axis L2 of the brace member 4 (the second portion 44).

In the fourth example, it is preferred that the position of the slider 59 (the second shaft support 5) can be fixed in relation to the brace member 4. For example, a long hole 49 may be provided in the brace member 4, and a through-hole may be provided in the second shaft support 5 (the slider 59), as shown in FIG. 15. The position of the slider 59 may then be fixed in relation to the brace member 4 by a nut and a bolt 519 inserted through the long hole 49 and the through-hole.

In the fourth example, the second shaft support 5 can slide in relation to the brace member 4. Alternatively, the second shaft support 5 may be affixed to the brace member 4, and the first shaft support 3 may be made to be capable of sliding in relation to the brace member 4. In this case, the first shaft support 3 itself functions as a slider.

As another alternative, the first shaft support 3 and the second shaft support 5 may be affixed to the brace member 4, and the portion of the brace member 4 positioned between the first shaft support 3 and the second shaft support 5 may be extendable and contractible. In this case, the distance between the first shaft support 3 and the second shaft support 5 changes due to the portion of the brace member 4 positioned between the first shaft support 3 and the second shaft support 5 being extended or contracted. Thus, the angle between the longitudinal axis L1 of the shaft portion D and the longitudinal axis L2 of the brace member 4 can be adjusted. In this case, part of the brace member 4 can be said to function as a slider.

Fifth Example of Second Angle Adjustment Mechanism

Figure 16:
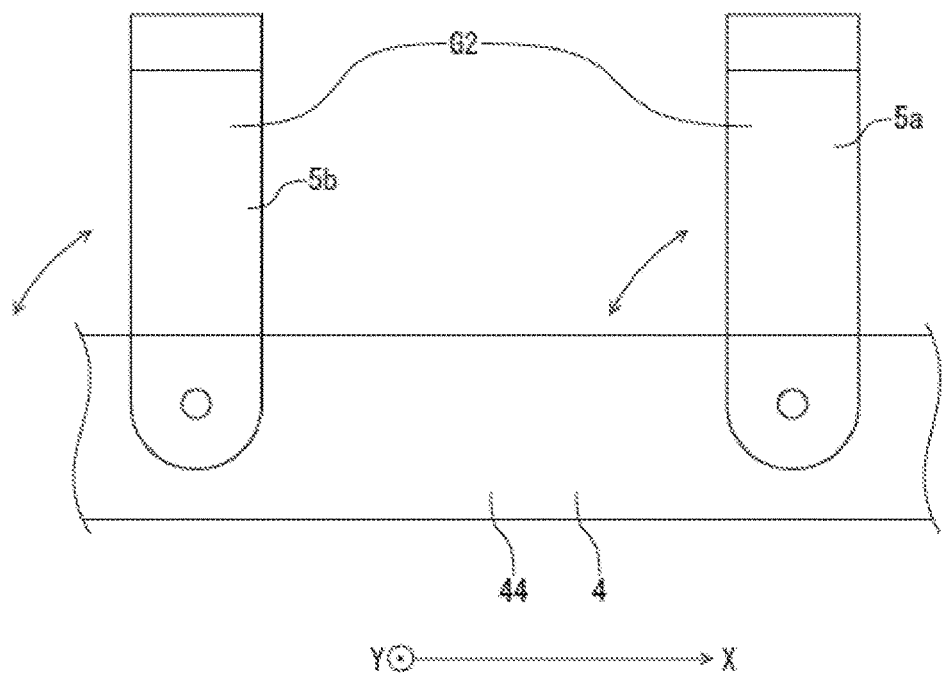
FIG. 16 is a schematic side view schematically depicting a linking portion (modification) between the brace member and the second shaft support.

A fifth example of the second angle adjustment mechanism shall be described with reference to FIG. 16. FIG. 16 is a schematic side view schematically depicting between the brace member 4 (the second portion 44) and the second shaft support 5. In the fifth example, the second angle adjustment mechanism G2 is provided with a plurality of second shaft supports (5a, 5b). A tilt of the shaft portion D relative to the brace member 4 differs between a case in which the shaft portion D is supported by the first shaft support 3 and the second shaft support 5a on a side near the first shaft support 3, and a case in which the shaft portion D is supported by the first shaft support 3 and the second shaft support 5b on a side far from the first shaft support 3. In the fifth example, it is possible to adjust the angle between the longitudinal axis L1 of the shaft portion D of the elongated tool supported by the first shaft support 3 and the second shaft supports (5a, 5b) and the longitudinal axis L2 of the brace member 4, by selecting the second shaft support that, among the plurality of second shaft supports (5a, 5b), will be used to support the shaft portion D.

Method for Supporting Elongated Tool Using Elongated Tool Support Device 1 in Second Embodiment An example shall be described of a method for supporting the elongated tool using the elongated tool support device 1 in the second embodiment. First through fifth steps ST1 to ST5 are similar to the first through fifth steps ST1 to ST5 in the first embodiment. Therefore, that would be repetitive for the first through fifth steps ST1 to ST5 are omitted.

In a sixth step ST6, the second angle adjustment mechanism G2 is used to adjust the tilt of the shaft portion D of the elongated tool. In order for the second angle adjustment mechanism G2 to be used to adjust the tilt of the shaft portion D, for example, the cam member 510 is preferably rotated. Alternatively, the slider 513 or the slider 59 may be slidably moved. As another alternative, the second shaft support that supports the shaft portion D may be changed to another second shaft support.

Before the first step ST1, the angle of the second portion 44 relative to the first portion 42 may be adjusted using the first angle adjustment mechanism G1.

The second embodiment exhibits effects similar to those of the first embodiment. Additionally, the second embodiment exhibits exceptional effects such as the following. With the elongated tool T placed on the first shaft support 3, it is difficult to adjust the tilt of the elongated tool T using the first angle adjustment mechanism G1. This is because a load greater than the weight of the elongated tool T (particularly, great bending stress) acts on the first angle adjustment mechanism G1. Conversely, with the elongated tool T placed on the first shaft support 3, it is easy to adjust the tilt of the elongated tool T using the second angle adjustment mechanism G2. In order to adjust the tilt of the elongated tool T using the second angle adjustment mechanism G2, it is preferable that, for example, the cam member 510 simply be rotated. Alternatively, a slider is simply slidably moved. As another alternative, the second shaft support that supports the shaft portion D of the elongated tool is preferably changed to another second shaft support.

The elongated tool support device 1 in the second embodiment is provided with the first angle adjustment mechanism G1, and the second angle adjustment mechanism G2 which is different from the first angle adjustment mechanism G1. Therefore, the angle of the second portion 44 relative to the first portion 42 can be adjusted using the first angle adjustment mechanism G1 in order to roughly adjust the angle at which the elongated tool T is supported. This angle adjustment is performed before the elongated tool T is placed on the first shaft support 3. Next, it is possible to use the second angle adjustment mechanism G2 to finely adjust the angle at which the elongated tool T is supported. This support angle adjustment can be carried out after the elongated tool T has been placed on the first shaft support 3.

Figure 17:
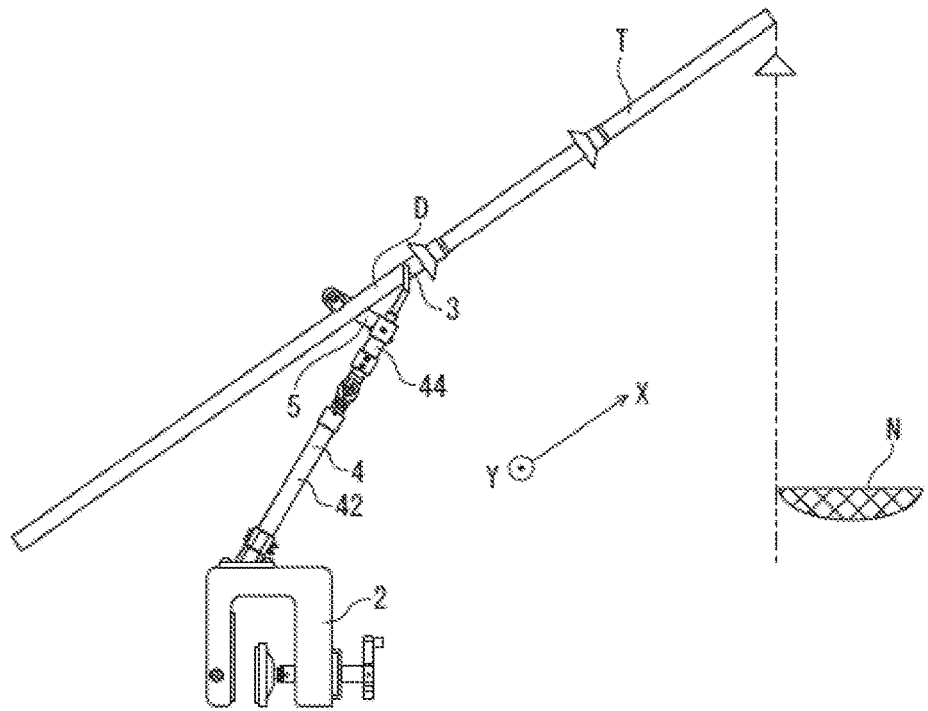
FIG. 17 is a schematic side view of the elongated tool support device in the second embodiment.

The effect derived from using the second angle adjustment mechanism G2 to finely adjust the angle at which the elongated tool T is supported shall be described further. A drop prevention net N is disposed below a remotely manipulated tool or another elongated tool T, as shown in FIG. 17. A case is considered in which the drop prevention net N is not positioned directly below the tip end of the elongated tool T after the elongated tool T has been placed on the first shaft support 3. In this case, the elongated tool support device 1 is not provided with the second angle adjustment mechanism G2, the angle of the second portion 44 relative to the first portion 42 must be adjusted using the first angle adjustment mechanism G1 so that the drop prevention net N is positioned directly below the tip end of the elongated tool T. Firstly, the elongated tool T is taken off the first shaft support 3; secondly, the angle of the second portion 44 relative to the first portion 42 is adjusted using the first angle adjustment mechanism G1; and thirdly, the elongated tool T must be placed back on the first shaft support 3. After a readjustment, when the drop prevention net N is not positioned directly below the tip end of the elongated tool T, the angle of the second portion 44 relative to the first portion 42 must be adjusted using the first angle adjustment mechanism G1 by repeating this process.

Conversely, when the elongated tool support device 1 is provided with the second angle adjustment mechanism G2, the angle at which the elongated tool T is supported can be finely adjusted using the second angle adjustment mechanism G2, with the shaft portion D of the elongated tool placed on the first shaft support 3. For example, it is preferable that the cam member 510 is simply rotated. Alternatively, it is preferable that a slider is simply slidably moved. As another alternative, it is preferable that the second shaft support that supports the elongated tool T simply be changed to another second shaft support.

Material of Elongated Tool Support Device 1

Any material can be selected as the material of the elongated tool support device 1. As one example, the securing tool 2, the first shaft support 3, and the second shaft support 5 may each be formed from an aluminum alloy or another metal. Additionally, a fiber-reinforced plastic or an aluminum alloy or another metal may be used as the material of the brace member 4.

The above embodiments are not provided by way of limitation on the present invention, and it is clear that the embodiments can be modified or changed as appropriate within the range of the technical ideals of the present invention. Any constituent element used in the embodiments can be combined with another embodiment, and any constituent element can also be omitted in the embodiments.

INDUSTRIAL APPLICABILITY

When the elongated tool support device of the present invention is used, a worker does not need to hold an elongated tool for a long period of time. Consequently, this device is useful for one who performs work using a long, thin, elongated tool, such as a remotely manipulated tool, etc.

REFERENCE SIGNS LIST

1: elongated tool support device
2: securing tool
3: first shaft support
3a: placement surface
4: brace member
4a: proximal part
4b: distal end part
5, 5a, 5b: second shaft supports
21: first grasping member 21a: grasping surface
22: second grasping member
22a: grasping surface
30: support part
30a: coating layer
31: shaft part
32: opening/closing member
33: hinge
42: first portion
42a: first rosette part
44: second portion
44a: second rosette part
46: shaft member
47: securing pin
48: shaft pin
49: long hole
51: contact part
51a: inner-side surface
53: arm
53a: through-hole
53b: screw member
57: opening part
59: slider
210: opening part
221: pressing part
222: shaft part
223: manipulated member
301: first end part
302: second end part
420: through-hole
440: through-hole
510: cam member
510a: outer peripheral surface
510b: groove
511: fall-preventing plate
512: support pin
513: slider
513a: screw hole
514: manipulated knob part
519: bolt
D: shaft portion
G1: first angle adjustment mechanism
G2: second angle adjustment mechanism
N: drop prevention net
T: elongated tool

The invention claimed is:

1. An elongated tool support device, comprising:
a securing tool;
a first shaft support that is disposed farther toward a distal side than the securing tool and that is configured to upwardly support a shaft portion of an elongated tool from below;
a brace member disposed between the securing tool and the first shaft support, wherein the brace member includes a first portion that is connected to the securing tool, and a second portion that is connected to the first shaft support, and the second portion is connected such that an angle thereof is able to be adjusted and fixed about a first axis in relation to the first portion;
a second shaft support that is attached to the brace member and that is configured to downwardly support the shaft portion of the elongated tool from above;
a first angle adjustment mechanism that is configured to adjust an angle between the first portion and the second portion; and
a second angle adjustment mechanism that is configured to adjust an angle between a longitudinal axis of the shaft portion when the shaft portion is supported by the first shaft support and the second shaft support, and a longitudinal axis of the second portion;
wherein the second angle adjustment mechanism includes a cam member, a fall-preventing plate that prevents the shaft portion from falling from the cam member, and a groove formed on an outer peripheral surface of the cam member and being capable of receiving the shaft portion;
wherein the second shaft support comprises:
a contact part that is configured to come into contact with an upper surface of the shaft portion of the elongated tool, and
an arm that connects the contact part and the brace member,
wherein the arm is supported on the brace member in a cantilever manner.

2. The elongated tool support device of claim 1, wherein:
the first shaft support has a placement surface which is configured to support the shaft portion of the elongated tool; and
an upper part of the placement surface is open.

3. The elongated tool support device of claim 2, wherein:
the second shaft support is capable of moving between a first position which is configured to support the shaft portion of the elongated tool, and a second position, which is a retracted position.

4. The elongated tool support device of claim 3, wherein:
the second shaft support is free to swing about an axis perpendicular to a longitudinal direction of the brace member.

5. The elongated tool support device of claim 4, wherein:
one side part of the second shaft support is an opening part.

6. The elongated tool support device of claim 3, wherein:
one side part of the second shaft support is an opening part.

7. The elongated tool support device of claim 1, wherein:
the second shaft support is capable of moving between a first position which is configured to support the shaft portion of the elongated tool, and a second position, which is a retracted position.

8. The elongated tool support device of claim 7, wherein:
the second shaft support is free to swing about an axis perpendicular to a longitudinal direction of the brace member.

9. The elongated tool support device of claim 1, wherein:
the second shaft support is disposed between the first shaft support and the first axis.

10. A method for supporting an elongated tool using the elongated tool support device of claim 1, comprising:
a first angle adjustment step of adjusting the angle between the first portion and the second portion;
a step of placing the elongated tool on the first shaft support; and
a second angle adjustment step of adjusting the angle between the longitudinal axis of the elongated tool and the longitudinal axis of the second portion using the second angle adjustment mechanism in a state in which the elongated tool has been placed on the first shaft support.

* * * * *